United States Patent
Moonen et al.

(10) Patent No.: US 10,931,640 B2
(45) Date of Patent: Feb. 23, 2021

(54) TUNNELING NETWORK TRAFFIC USING OBJECT STORAGE

(71) Applicant: INTERNATIONAL BUSINESS MACHINES CORPORATION, Armonk, NY (US)

(72) Inventors: Scott Moonen, Fuquay Varina, NC (US); Robert E. Warren, Raleigh, NC (US); Robley Hall, Portsmouth, NH (US); Daniel de Araujo, Round Rock, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 315 days.

(21) Appl. No.: 16/015,622

(22) Filed: Jun. 22, 2018

(65) Prior Publication Data

US 2019/0394164 A1 Dec. 26, 2019

(51) Int. Cl.
*H04L 29/06* (2006.01)
*H04L 12/46* (2006.01)
*G06F 9/54* (2006.01)

(52) U.S. Cl.
CPC ............ *H04L 63/029* (2013.01); *G06F 9/547* (2013.01); *H04L 12/4633* (2013.01); *H04L 63/08* (2013.01); *H04L 63/0272* (2013.01)

(58) Field of Classification Search
CPC ... H04L 63/029; H04L 63/08; H04L 63/0272; H04L 63/0281; H04L 63/168; H04L 12/4633; H04L 49/103; H04L 49/107; H04L 49/108; H04L 67/02; H04L 67/2842; H04L 67/2852; G06F 9/547; G06F 16/2219; G06F 17/00; G06F 15/16; H04J 2203/01

USPC ..................................... 726/12, 14; 709/213
See application file for complete search history.

(56) References Cited

U.S. PATENT DOCUMENTS

| | | | |
|---|---|---|---|
| 6,799,220 B1 | 9/2004 | Merritt et al. | |
| 7,843,906 B1* | 11/2010 | Chidambaram | H04L 67/1097 370/386 |
| 8,180,735 B2* | 5/2012 | Ansari | H04L 12/2803 707/640 |
| 8,341,720 B2* | 12/2012 | Ben-Yochanan | H04L 63/0227 726/12 |
| 8,458,390 B2 | 6/2013 | Mehrotra et al. | |
| 8,505,074 B2 | 8/2013 | Ferlitsch et al. | |
| 8,611,349 B1* | 12/2013 | Judge | H04L 45/58 370/392 |
| 8,832,818 B2* | 9/2014 | Kuehl | H04L 63/0209 726/12 |

(Continued)

OTHER PUBLICATIONS

Mell et al., "The NIST Definition of Cloud Computing", NIST, Special Publication 800-145, Sep. 2011, 7 pages.

(Continued)

*Primary Examiner* — Kambiz Zand
*Assistant Examiner* — Mahabub S Ahmed
(74) *Attorney, Agent, or Firm* — Michael O'Keefe; Andrew D. Wright; Roberts Calderon Safran & Cole, P.C.

(57) ABSTRACT

Methods and systems for managing computer network traffic are provided. A computer implemented method includes tunneling network traffic between a first network and a second network using a data storage system that is shared by the first network and the second network.

20 Claims, 5 Drawing Sheets

(56) References Cited

U.S. PATENT DOCUMENTS

| | | | |
|---|---|---|---|
| 8,843,998 B2 | 9/2014 | Fu et al. | |
| 9,251,114 B1* | 2/2016 | Ancin | H04L 63/08 |
| 9,355,060 B1* | 5/2016 | Barber | H04L 67/1097 |
| 9,565,175 B1* | 2/2017 | Saylor | G06F 21/6218 |
| 9,813,379 B1* | 11/2017 | Shevade | H04L 41/5051 |
| 9,832,076 B2 | 11/2017 | Ryu et al. | |
| 9,912,752 B1 | 3/2018 | Davis et al. | |
| 10,025,673 B1* | 7/2018 | MacCanti | G06F 11/1451 |
| 10,394,766 B2* | 8/2019 | Dejana | G06F 3/067 |
| 10,498,837 B1* | 12/2019 | Bondalapati | H04L 67/16 |
| 10,581,680 B2* | 3/2020 | Freimuth | H04L 41/0826 |
| 10,635,642 B1* | 4/2020 | Haggerty | G06F 21/31 |
| 10,762,230 B2* | 9/2020 | Ancin | H04L 63/08 |
| 2003/0149787 A1* | 8/2003 | Mangan | H04L 45/302 |
| | | | 709/238 |
| 2003/0221124 A1* | 11/2003 | Curran | H04L 63/10 |
| | | | 726/12 |
| 2004/0076155 A1* | 4/2004 | Yajnik | H04L 45/306 |
| | | | 370/389 |
| 2005/0144195 A1* | 6/2005 | Hesselink | H04L 63/029 |
| 2005/0207382 A1* | 9/2005 | Hirashima | H04W 8/12 |
| | | | 370/338 |
| 2006/0010225 A1* | 1/2006 | Issa | H04L 67/02 |
| | | | 709/217 |
| 2006/0112188 A1* | 5/2006 | Albanese | H04L 67/10 |
| | | | 709/238 |
| 2007/0028001 A1* | 2/2007 | Phillips | H04L 29/06 |
| | | | 709/238 |
| 2007/0260718 A1* | 11/2007 | Shenfield | H04L 67/26 |
| | | | 709/223 |
| 2009/0007253 A1* | 1/2009 | Chung | H04L 67/02 |
| | | | 726/12 |
| 2010/0205152 A1* | 8/2010 | Ansari | H04L 49/25 |
| | | | 707/654 |
| 2011/0035527 A1* | 2/2011 | Hoese | H04L 61/106 |
| | | | 710/315 |
| 2012/0030738 A1* | 2/2012 | Lin | H04L 67/06 |
| | | | 726/6 |
| 2012/0297088 A1* | 11/2012 | Wang | H04L 63/0876 |
| | | | 709/238 |
| 2013/0073854 A1* | 3/2013 | Patti | H04L 9/088 |
| | | | 713/171 |
| 2013/0117766 A1* | 5/2013 | Bax | G06F 9/4405 |
| | | | 719/323 |
| 2013/0138763 A1* | 5/2013 | Panzer | H04L 67/10 |
| | | | 709/213 |
| 2013/0242962 A1* | 9/2013 | Tung | G06F 1/1698 |
| | | | 370/338 |
| 2014/0101750 A1* | 4/2014 | Harrison | H04L 63/0281 |
| | | | 726/12 |
| 2014/0192710 A1* | 7/2014 | Charette | H04W 40/02 |
| | | | 370/328 |
| 2014/0254546 A1* | 9/2014 | L'Heureux | H04L 67/306 |
| | | | 370/331 |
| 2014/0259147 A1* | 9/2014 | L'Heureux | H04L 63/083 |
| | | | 726/14 |
| 2014/0317719 A1* | 10/2014 | Dubrovsky | H04L 63/1416 |
| | | | 726/12 |
| 2015/0089577 A1* | 3/2015 | Beckman | G06F 21/10 |
| | | | 726/1 |
| 2015/0169436 A1* | 6/2015 | Tamilmani | H04L 67/1097 |
| | | | 717/124 |
| 2015/0201033 A1* | 7/2015 | Gupta | H04L 67/2842 |
| | | | 709/213 |
| 2016/0171025 A1 | 6/2016 | Ji et al. | |
| 2016/0277497 A1* | 9/2016 | Bannister | G06F 3/0605 |
| 2016/0316383 A1* | 10/2016 | He | H04L 61/1511 |
| 2016/0366217 A1* | 12/2016 | Eda | H04L 67/1097 |
| 2017/0061141 A1* | 3/2017 | Redberg | H04L 63/02 |
| 2017/0091235 A1* | 3/2017 | Yammine | G06F 16/1865 |
| 2017/0091296 A1* | 3/2017 | Beard | G06F 16/258 |
| 2017/0093798 A1* | 3/2017 | McKinion | H04L 63/0281 |
| 2017/0111328 A1* | 4/2017 | Leon | H04L 9/30 |
| 2017/0123935 A1* | 5/2017 | Pandit | G06F 11/1446 |
| 2017/0161298 A1* | 6/2017 | Banerjee | G06F 16/11 |
| 2017/0237601 A1 | 8/2017 | Zhu et al. | |
| 2018/0145983 A1* | 5/2018 | Bestler | H04L 9/3236 |
| 2018/0373887 A1* | 12/2018 | Smith | G06F 3/0605 |
| 2019/0124100 A1* | 4/2019 | Shannon | H04L 63/101 |
| 2019/0205050 A1* | 7/2019 | Koorapati | G06F 16/162 |
| 2019/0220367 A1* | 7/2019 | Kashi Visvanathan | G06F 11/1464 |
| 2019/0227713 A1* | 7/2019 | Parthasarathy | G06F 3/064 |
| 2019/0317930 A1* | 10/2019 | Mishra | G06F 16/2219 |
| 2019/0379725 A1* | 12/2019 | Wada | H04L 67/02 |
| 2020/0117523 A1* | 4/2020 | Morrison | G06N 20/00 |

OTHER PUBLICATIONS

Heer et al., "Secure Wi-Fi sharing at global scales", Telecommunications, 2008 IEEE, 2008, 7 pages.

Nunes et al., "Namespace Tunnels in Content-Centric Networks", Local Computer Networks (LCN), 2017 IEEE, 2017, 8 pages.

"What is Object Storage?", Scality, https://www.scality.com/object-storage/, accessed Apr. 22, 2018; 12 pages.

"IBM Cloud Object Storage", IBM Cloud, https://www.ibm.com/cloud/object-storage, accessed Apr. 22, 2018; 17 pages.

"Cloud storage gateway", Wikipedia, accessed Apr. 22, 2018; 2 pages.

"How Aspera fasp Technology Overcomes The Limitations of Using Internet Networks to Transport Large Data Files", www.root6.com, accessed Apr. 9, 2018; 7 pages.

"Network Address Translation (NAT) FAQ", Cisco, https://www.cisco.com/c/en/us/support/docs/ip/network-address-translation-nat/26704-nat-faq-00.html, accessed Apr. 22, 2018; 17 pages.

"Object storage", Wikipedia, accessed Apr. 22, 2018; 10 pages.

"What is Cloud Object Storage?", Amazon Web Servies, https://aws.amazon.com/what-is-cloud-object-storage/, accessed Apr. 22, 2018; 10 pages.

* cited by examiner

TUNNELING NETWORK TRAFFIC USING OBJECT STORAGE

BACKGROUND

The present invention relates generally to managing computer network traffic and, more specifically, to tunneling network traffic using object storage.

Public cloud service providers normally provide customers with the option of deploying services (such as bare metal servers, virtual machines, etc.) into dedicated private networks that are not shared between customers or connected to the public Internet. Such services running in a dedicated private network often need to connect to other services on or through the public cloud, for example to register licenses, forward logs, and connect to management infrastructure. Typically, the connections between private and public networks are accomplished using a network gateway device to bridge the two networks. The network gateway device provides network address translation (NAT) or virtual private network (VPN) and firewall capabilities between the two environments to restrict network access only as needed.

SUMMARY

In a first aspect of the invention, there is a computer implemented method that includes tunneling network traffic between a first network and a second network using a data storage system that is shared by the first network and the second network.

In another aspect of the invention, there is a computer program product that includes a computer readable storage medium having program instructions embodied therewith. The program instructions are executable by a computing device to cause the computing device to tunnel network traffic between a private network and a public network using an object storage system that is shared by the private network and the public network, wherein the object storage system is the only interface between the private network and the public network In another aspect of the invention, there is a system that includes: a hardware processor, a computer readable memory, and a computer readable storage medium associated with a computing device; and program instructions to tunnel network traffic between a private network and a public network using an object storage system that is shared by the private network and the public network. The object storage system is the only interface between the private network and the public network. The program instructions are stored on the computer readable storage medium for execution by the hardware processor via the computer readable memory

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention relates generally to managing computer network traffic and, more specifically, to tunneling network traffic using object storage. Systems that employ network gateway devices for network traffic between a customer's private network and a public network are perceived by some as a security risk because they utilize a public IP address that is an easily accessible and recognizable attack surface for hackers. Such systems include, for example, Internet Protocol Security (IPsec) and NAT. Many customers are uncomfortable having their private networks connected to a public IP address in this manner. Aspects of the invention are directed to tunneling network traffic between a customer's private network and a public network using object storage instead of network gateway devices.

Object storage (also known as object-based storage) is a computer data storage architecture that manages data as objects, as opposed to other storage architectures like file systems which manage data as a file hierarchy, and block storage which manages data as blocks within sectors and tracks. Each object typically includes the data itself, a variable amount of metadata, and a globally unique identifier. Object storage is a storage technology used for both private clouds and public cloud service providers, and provides redundant, scalable data storage capable of storing petabytes of data using clusters of standardized servers.

In embodiments of the present invention, network traffic is communicated between a private network and a public network by writing files to, and reading files from, an object storage system that has an endpoint in the private network and an endpoint in the public network. In this manner, implementations of the invention avoid using a network gateway device for network communication between the two networks, and instead use a storage gateway device for such communication. Instead of bridging or tunneling network traffic using NAT, VPN, or message queues, embodiments of the invention tunnel network traffic using object storage. In embodiments, the object storage between the private network and the public network provides the foundation for authentication, access control, encryption, and availability of the tunneled communications between the networks. In particular embodiments, object storage interfaces are the only interfaces between the private network and the public network, such that the object storage provides the only avenue for network traffic between the private network and the public network. By utilizing object storage devices instead of network gateway devices, customers need not have their private networks connected to a public IP address, as is the case with systems and techniques that rely on network gateway devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
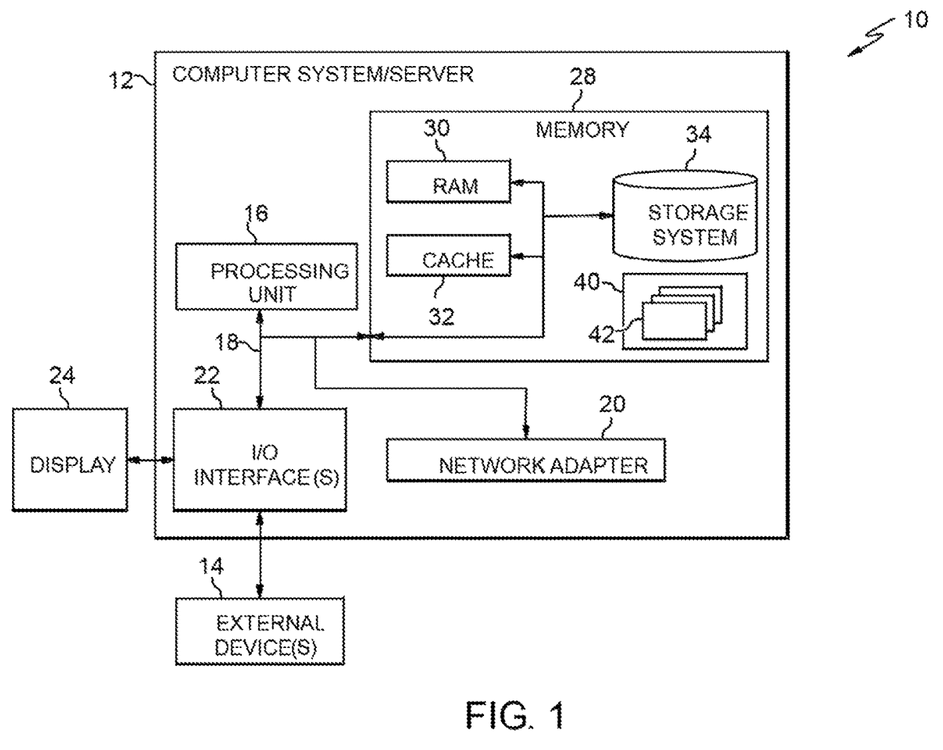
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
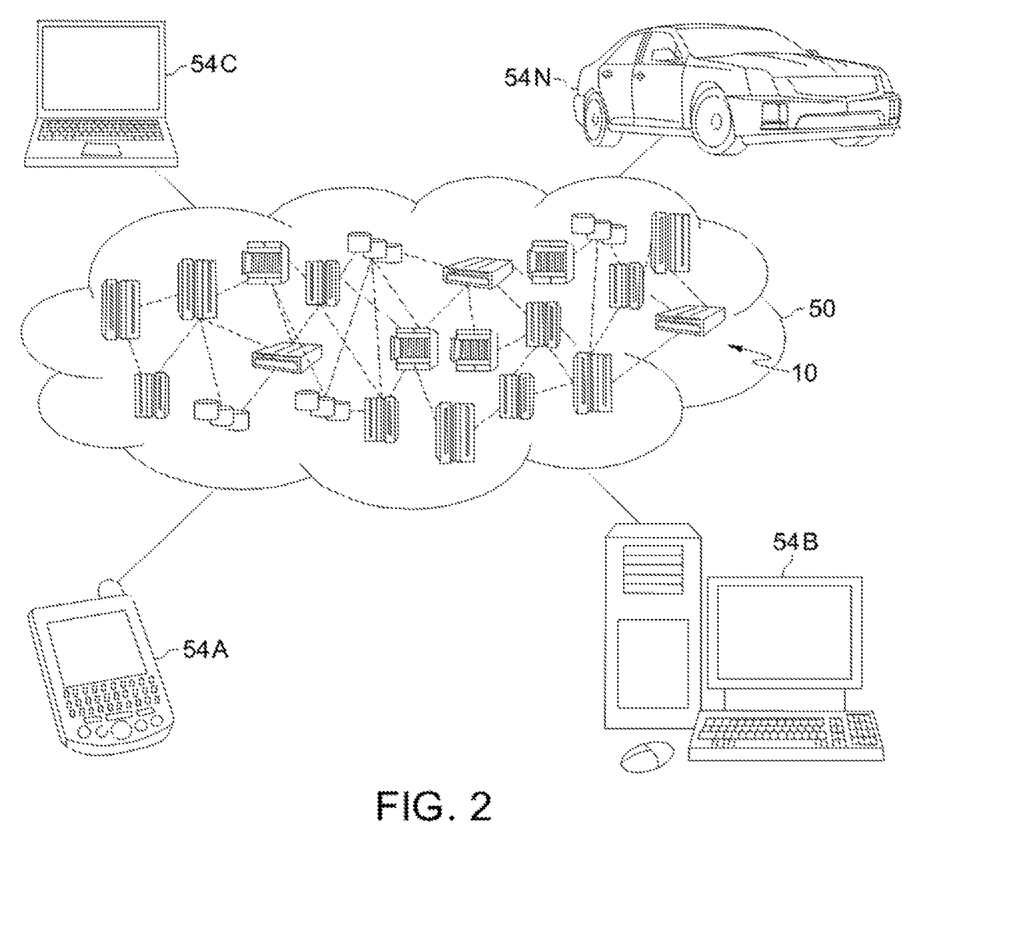
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
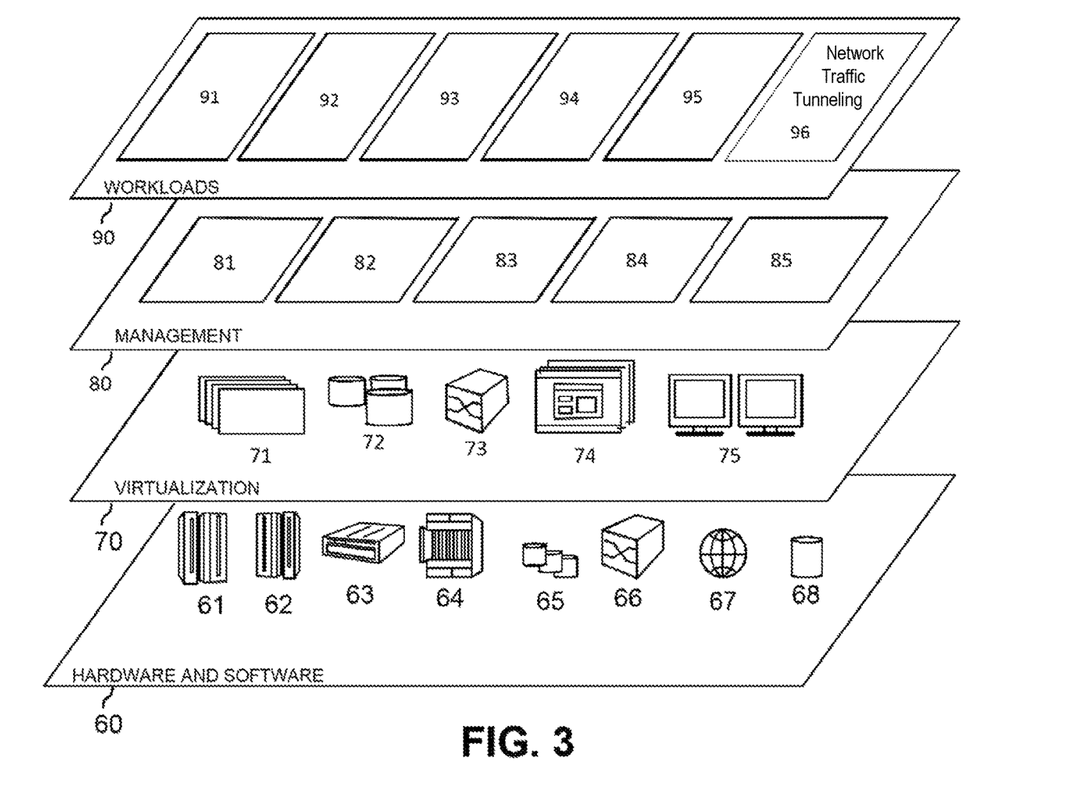
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and network traffic tunneling 96.

Figure 4:
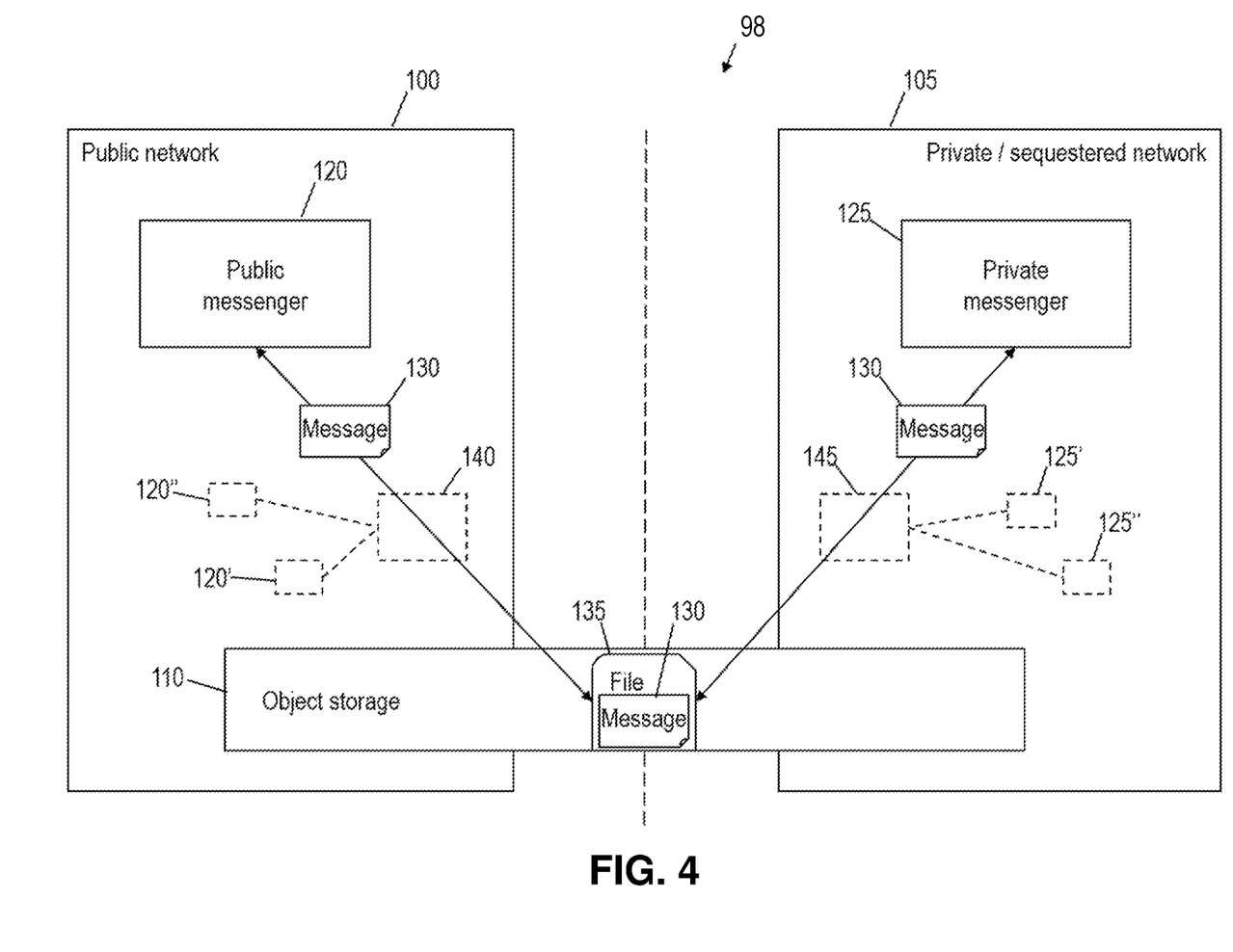
FIG. 4 shows a block diagram of an exemplary environment in accordance with aspects of the invention.

FIG. 4 depicts a block diagram of an illustrative environment 98 in accordance with aspects of the invention. The environment includes a public network 100, a private network 105, and an object storage system 110. The public network 100 may comprise a public cloud network that uses public IP address space including, for example, portions of the Internet. The private network 105 may comprise a network that uses private IP address space, and may comprise, for example, a private LAN used by an enterprise. Each respective network 100 and 105 may comprise plural nodes that communicate with each other inside the respective network in a conventional manner. For example, the public network 100 may comprise a public cloud computing environment 50 comprising a plurality of computing nodes 10 (as described with respect to FIG. 2) that communicate with each other using public IP addresses in a conventional manner. Similarly, the private network 105 may comprise a plurality of computing devices that communicate with each other using private IP addresses in a conventional manner.

According to aspects of the invention, the object storage system 110 comprises at least one object storage device having a first endpoint in the public network 100 and a second endpoint in the private network 105. In embodiments, the object storage system 110 comprises a cluster of computer hardware running software that implements an object storage protocol, which has an understood meaning in the art. For example, the object storage system 110 may comprise at least one server that includes computer data storage, wherein the at least one server runs object storage software that is configured to receive application program interface (API) calls from at least one node in the public network 100 and from at least one node in the private network 105 for writing files to the computer data storage and reading files from the computer data storage. In an exemplary implementation, the object storage system 110 is controlled and maintained by a third party service provider (e.g., a cloud service provider), and the owner of the private network 105 has a subscription with the cloud service provider to obtain object storage services associated with the object storage system 110.

In accordance with aspects of the invention, the object storage system 110 is a storage gateway device as opposed to a network gateway device (e.g., such as a router). In a particular embodiment, the object storage system 110 comprising a storage gateway device is the only interface between the public network 100 and the private network 105, such that there is not a network gateway device (e.g., a router) that provides an interface between the two networks 100 and 105. In this particular embodiment, there is no network connectivity between devices in the public network 100 and devices in the private network 105, and the network messages are conveyed using the object storage system 110 instead of network transport.

Figure 5:
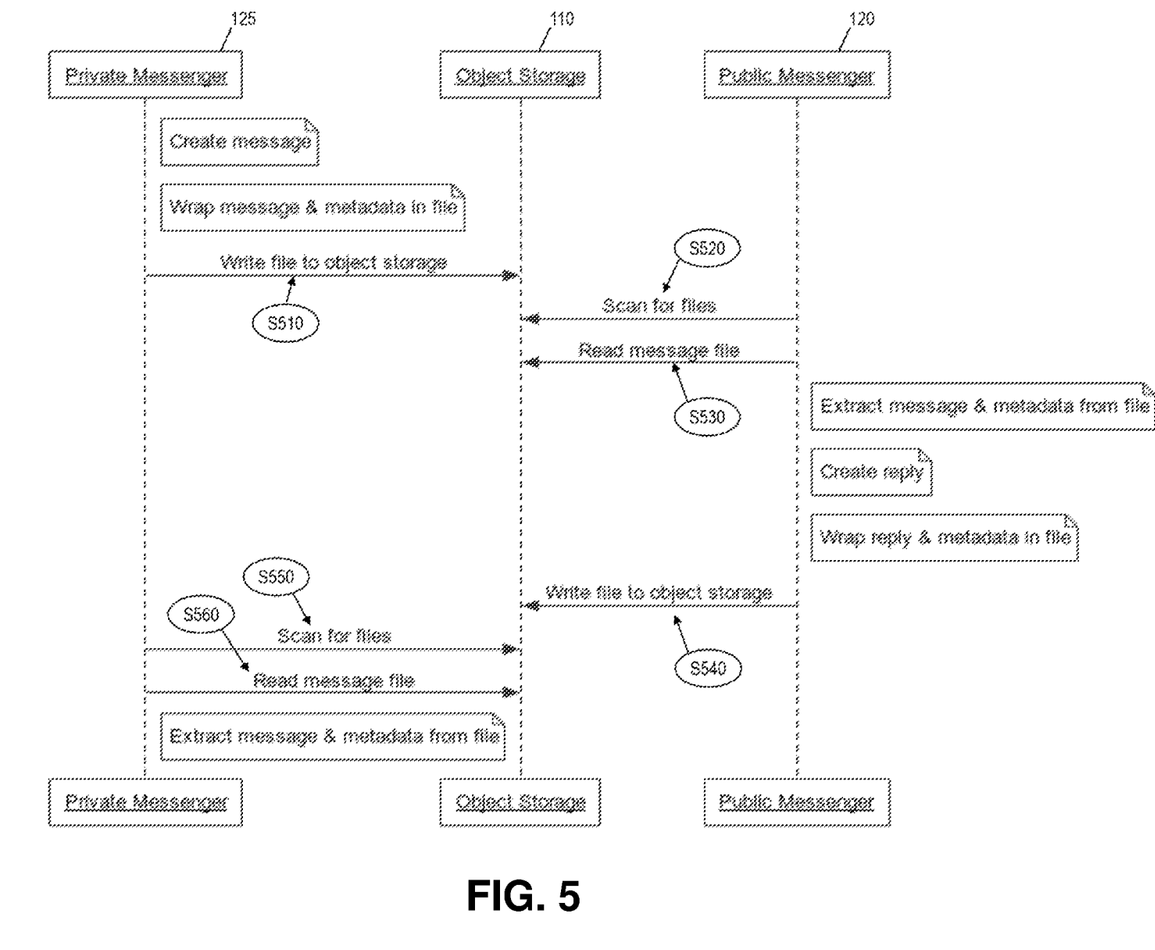
FIG. 5 shows a sequence diagram illustrating an exemplary method in accordance with aspects of the invention.

FIG. 5 shows a sequence diagram illustrating an exemplary method of sending and receiving a network communication using object storage tunneling in accordance with aspects of the invention. The steps of the method may be performed in the environment 98 of FIG. 4 and are described with reference to the elements and steps described with respect to FIGS. 4 and 5.

At step S510, a private messenger 125 (e.g., a computer device inside the private network 105) creates a message 130, wraps the message 130 and metadata in a file 135, and writes the file 135 to the object storage system 110. In accordance with aspects of the invention, the message 130 is a network communication intended for a public messenger 120 (e.g., a computer device inside the public network 100). For example, the message 130 may comprise a network communication such as an IP datagram, a TCP message, or an HTTP request.

In embodiments, step S510 includes the private messenger 125 authenticating with the object storage system 110 and storing the file 135 in the object storage system 110 with a unique file name. The authenticating and the storing the file 135 may be accomplished using APIs, e.g., by the private messenger 125 sending one or more API calls to the object storage system 110.

Still referring to step S510, the metadata that is added to the message 130 may include information that is used by the intended recipient of the message to identify the message in the object storage system 110. The metadata may also include information that is used by the intended recipient to reconstruct the message. For example, when the message 130 comprises an HTTP request, the metadata may include the IP addresses and TCP ports of the private messenger 125 and the public messenger 120.

In another example, when plural messages 130 are used to convey a TCP stream between the messengers 120 and 125, each one of the plural messages 130 may contain a segment of the TCP stream. In this example, the metadata may include the IP addresses and TCP ports of the two messengers 120 and 125 as well as sequencing information that allows the recipient to reconstruct the plural segments of the TCP stream into a single continuous stream.

In another example, when the message 130 is used to convey UDP datagrams or IP packets between the between the messengers 120 and 125, then the message 130 may include the data for each datagram or packet. In the case of IP packets, no additional metadata may be necessary. In the case of UDP datagrams, the metadata may comprise the IP addresses of the two messengers 120 and 125.

Still referring to FIG. 5, at step S520 the public messenger 120 scans the object storage system 110 for new files. In embodiments, the public messenger 120 periodically authenticates with the object storage system 110 and scans the object storage system 110 for new files saved in the object storage system 110 by the private messenger 125. The authenticating and the scanning may be accomplished using APIs, e.g., by the public messenger 120 sending one or more API calls to the object storage system 110. The scanning may comprise examining the metadata associated with each file stored in the object storage system 110 to find information that identifies the public messenger 120 as the intended recipient of a particular file.

At step S530, the public messenger 120 reads a file (i.e., a file identified by the scanning at step S520) from the object storage system 110. The reading may be accomplished using APIs, e.g., by the public messenger 120 sending one or more API calls to the object storage system 110. Step S530 may comprise the public messenger 120 extracting the message 130 and metadata from the file 135 and performing a function or task in response to the message 130.

At step S540, the public messenger 120 creates a reply message, wraps the reply message and metadata in a file, and writes the file to the object storage system 110. Step S540 may be performed in a manner similar to step S510, except that step S540 is performed by the public messenger 120 in response to the initial message created by the private messenger 125 at step S510.

At step S550, the private messenger 125 scans the object storage system 110 for new files. Step S550 may be performed by the private messenger 125 in a manner similar to that described with respect to step S520.

At step S560, the private messenger 125 reads a file (i.e., a file identified by the scanning at step S550) from the object storage system 110. Step S560 may be performed by the private messenger 125 in a manner similar to that described with respect to step S530.

In an exemplary implementation of the method depicted in FIG. 5, the public messenger 120 is exclusively sending HTTP requests to the private messenger 125 and, in response, the private messenger 125 is sending replies exclusively to the public messenger 120. In this example, the public messenger 120 writes HTTP requests to the private messenger 125 as files in the object storage system 110. The private messenger 125 runs a service that continuously monitors the object storage system 110 for files from the public messenger 120, and reads such files from the object storage system 110 when they are identified by the monitoring. Upon reading a file from the object storage system 110, the private messenger 125 forwards the contents of the message included in the file (e.g., the HTTP request) to one or more designated HTTP listeners on the private network 105. The private messenger 125 receives one or more responses from the one or more designated HTTP listeners on the private network 105, processes the responses, and writes one or more files containing the responses to the object storage system 110. The public messenger 120 runs a service that continuously monitors the object storage system 110 for files from the private messenger 125, and reads such files from the object storage system 110 when they are identified by the monitoring. Upon reading a file from the object storage system 110, the public messenger 120 processes the response that is included in the file.

In another exemplary implementation of the method depicted in FIG. 5, the public messenger 120 and the private messenger 125 run Linux "tun" or "tap" devices on their networks, with processes that write incoming packets from the device to the object storage system 110, and write the data contained in the incoming object storage files to the device. In this implementation, the public messenger 120 and the private messenger 125 can send IP datagrams or initiate TCP connections over the "tun" or "tap" devices in order to send and receive traffic across the object storage system 110 between the networks 100 and 105.

With continued reference to FIGS. 4 and 5, in embodiments the public messenger 120 and the private messenger 125 may each be directly connected to respective endpoints of the object storage system 110 in the respective networks 100 and 105. In this implementation, the public messenger 120 and the private messenger 125 each may perform the functions of: creating a message; wrapping the message and metadata in the file, writing the file to the object storage system 110; scanning the object storage system 110; reading the file from the object storage system 110; unwrapping (e.g., extracting) the message and the metadata from the file; and processing the message after the unwrapping. In this embodiment, the public messenger 120 and the private messenger 125 each may comprise a computer system/server 12 with one or more program modules 42 (as described with respect to FIG. 1) configured to perform functions described herein.

In an alternative embodiment, the private network 105 includes an internal network device 145 connected between plural computer devices (including the private messenger 125 and other devices 125' and 125") and the end point of the object storage system 110. In this embodiment, for outgoing messages, the private messenger 125 creates the message and sends the message to the internal network device 145, and the internal network device 145 performs the functions of: wrapping the message and metadata in the file; and writing the file to the object storage system 110. For incoming messages, the internal network device 145 performs the functions of: scanning the object storage system 110; reading the file from the object storage system 110; unwrapping (e.g., extracting) the message and the metadata from the file; and forwarding the message and the metadata to the private messenger 125. In this embodiment, each of the computer devices 125, 125', and 125" may comprise components of the computer system/server 12 described with respect to FIG. 1. Furthermore, the internal network device 145 may comprise a computer system/server 12 with one or more program modules 42 (as described with respect to FIG. 1) configured to perform functions described herein. The public network 100 may also include a network device 140 connected between plural computer devices (including the public messenger 120 and other devices 120' and 120") and another end point of the object storage system 110, wherein the network device 140 is configured to perform functions similar to those described with respect to internal network device 145.

In contrast to utilizing a network interface to send network communications between two networks, implementations of the invention as described herein utilize a storage interface (in particular an object storage interface) to tunnel network communications between two networks. Network interfaces involve the sending of a message from a sender to a receiver over a network medium. The sender and receiver might be represented by IP addresses, hostnames, port numbers, virtual interfaces, IMEI numbers, or some other location or addressing scheme. The message is routed through the network medium from sender to receiver, and is ephemeral in the sense that the message is not persistently stored during its routing through the network medium. Storage interfaces, on the other hand, involve the storing or saving of a message in a storage medium, followed by the later retrieval of the message from the storage medium. The message persists on the storage medium until it is removed and, thus, is not ephemeral like a message routed through a network interface. The sender and receiver share the storage medium, but their identity or location is not important to the medium for the purpose of routing the message (since the message is stored and not routed); their identity and location are used at the storage medium only for the purpose of restricting and granting access to the storage medium.

Aspects of the invention tunnel network communications from one network to another network via a shared storage medium between the networks. This is in contrast to conventional tunneling systems that tunnel network communications from one network to another network via another network medium between the networks. Although aspects of the invention are describe herein with respect to shared object storage, it is understood that embodiments of the invention may be used with other types of shared data storage that have SAVE/READ or PUT/GET semantics. Aspects of the invention differ from message queues because message queues constitute a "point to point" network medium rather than a storage medium. In particular, message queues are used with point to point network semantics to transport or route immediate/ephemeral messages rather than used as a durable shared storage medium to preserve messages. Aspects of the invention, on the other hand, persistently store files containing the messages in the shared storage medium (e.g., the object storage system 110). In this manner, in implementations of the invention the files (and therefore the messages) may be deleted after they are consumed (e.g., after they are read from the shared storage medium), or alternatively may be stored permanently to provide for functions such as audits and non-repudiation and/or non-deniability of the tunneled network communications.

In embodiments, a service provider could offer to perform the processes described herein. In this case, the service provider can create, maintain, deploy, support, etc., the computer infrastructure that performs the process steps of the invention for one or more customers. These customers may be, for example, any business that uses cloud computing technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method, comprising:
    tunneling network traffic between a first network and a second network using a data storage system that is shared by the first network and the second network, wherein the tunneling comprises: generating metadata associated with a message; wrapping the metadata and the message in a file; authenticating with the data storage system; and saving the file to the data storage system for an intended recipient of the message to read the file from the data storage system;
    the first network comprises a private network;
    the second network comprises a public network;
    the generating, the wrapping, the authenticating, and the saving are performed by an internal network device inside the private network; and
    the internal network device is in communication with plural computer devices inside the private network.

2. The method of claim 1, wherein the saving the file to the data storage system comprises writing the file to the data storage system with a unique file name.

3. The method of claim 1, wherein the metadata identifies the intended recipient of the message.

4. The method of claim 1, wherein the message is one of plural messages used to convey a TCP stream between a first messenger in the first network and a second messenger in the second network, wherein each of the plural messages contains a segment of the TCP stream, and wherein each of the plural messages contains metadata that includes IP addresses of the first and second messengers, TCP ports of the first and second messengers, and sequencing information that allows the intended recipient to reconstruct the segments of the TCP stream into a single continuous stream.

5. The method of claim 1, further comprising:
    the internal network device receiving the message from one of the plural computer devices inside the private network;
    the internal network device performing the generating, the wrapping, the authenticating, and the saving in response to the receiving the message from the one of the plural computer devices inside the private network;
    the internal network device scanning the data storage system for a response to the message;
    the internal network device reading another file from the data storage system in response to the scanning;
    the internal network device extracting a response message from the other file; and
    the internal network device forwarding the response message to the one of the plural computer devices inside the private network.

6. The method of claim 1, wherein the authenticating and the saving are performed using application program interface (API) calls from a device in the first network to the data storage system.

7. The method of claim 1, wherein:
    the first network comprises a private network including a private network device connected between the data storage system and plural computer devices inside the private network;
    the second network comprises a public network including a public network device connected between the data storage system and plural computer devices in the public network; and
    the tunneling comprises:
    the private network device scanning the data storage system for a file containing a message from one of the plural computer devices in the public network;
    the private network device reading the file from the data storage system in response to the scanning;
    the private network device extracting the message from the file; and
    the private network device forwarding the message to one of the plural computer devices inside the private network.

8. The method of claim 1, wherein the data storage system is an object storage system.

9. The method of claim 1, wherein:
    the data storage system has a first endpoint in the first network and a second endpoint in the second network; and
    the data storage system is the only interface between the first network and the second network such that there is not a router that provides an interface between the first network and the second network.

10. The method of claim 1, wherein:
    the data storage system is an object storage system comprising at least one server that includes computer data storage, wherein the at least one server runs object storage software that is configured to receive application program interface (API) calls from at least one node in the first network and from at least one node in the second network for writing files to the computer data storage and reading files from the computer data storage; and
    there is no network connectivity between devices in the first network and devices in the second network, and messages are conveyed between devices in the first network and devices in the second network using the object storage system instead of network transport.

11. A computer program product comprising a computer readable storage medium having program instructions embodied therewith, the program instructions executable by a computing device to cause the computing device to:
tunnel network traffic between a private network and a public network using an object storage system that is shared by the private network and the public network, wherein the object storage system is the only interface between the private network and the public network such that there is not a router that provides an interface between the private network and the public network.

12. The computer program product of claim 11, wherein the tunneling comprises:
generating metadata associated with a message;
wrapping the metadata and the message in a file;
authenticating with the object storage system; and
saving the file to the object storage system for an intended recipient of the message to read the file from the object storage system.

13. The computer program product of claim 12, wherein the message includes one selected from the group consisting of: an HTTP request, a TCP stream, UDP datagrams, and IP packets.

14. The computer program product of claim 13, wherein:
the computing device is an internal network device inside the private network; and
the internal network device is in communication with plural other computer devices inside the private network.

15. The computer program product of claim 14, wherein the program instructions cause the internal network device to:
receive the message from one of the plural other computer devices inside the private network;
perform the generating, the wrapping, the authenticating, and the saving in response to the receiving the message from the one of the plural other computer devices inside the private network;
scan the object storage system for a response to the message;
read another file from the object storage system in response to the scanning;
extract a response message from the other file; and
forward the response message to the one of the plural other computer devices inside the private network.

16. The computer program product of claim 15, wherein the object storage system comprises at least one server that includes computer data storage, wherein the at least one server runs object storage software that is configured to receive application program interface (API) calls from at least one node in the private network and from at least one node in the public network for writing files to the computer data storage and reading files from the computer data storage.

17. A system comprising:
a hardware processor, a computer readable memory, and a computer readable storage medium associated with a computing device;
program instructions to tunnel network traffic between a private network and a public network using an object storage system that is shared by the private network and the public network,
wherein the object storage system is the only interface between the private network and the public network such that there is not a router that provides an interface between the private network and the public network; and
the program instructions are stored on the computer readable storage medium for execution by the hardware processor via the computer readable memory.

18. The system of claim 17, wherein the tunneling comprises:
generating metadata associated with a message;
wrapping the metadata and the message in a file;
authenticating with the object storage system;
saving the file to the object storage system for an intended recipient of the message to read the file from the object storage system;
scanning the object storage system, after the saving, for a response file from the intended recipient;
reading the response file from the object storage system; and
extracting a response message from the response file.

19. The system of claim 18, wherein the message includes one selected from the group consisting of: an HTTP request, a TCP stream, UDP datagrams, and IP packets.

20. The system of claim 18, wherein the object storage system comprises at least one server that includes computer data storage, wherein the at least one server runs object storage software that is configured to receive application program interface (API) calls from at least one node in the private network and from at least one node in the public network for writing files to the computer data storage and reading files from the computer data storage.

* * * * *